United States Patent
Pearce

(10) Patent No.: US 8,574,441 B2
(45) Date of Patent: Nov. 5, 2013

(54) PROCESS FOR REMOVING OXIDANTS FROM WATER INJECTED INTO A SUBSURFACE AQUIFER TO PREVENT MOBILIZATION OF TRACE METALS

(75) Inventor: Mark S. Pearce, Pflugerville, TX (US)

(73) Assignee: Entrix, Inc., Houston, TX (US)

( * ) Notice: Subject to any disclaimer, the term of this patent is extended or adjusted under 35 U.S.C. 154(b) by 88 days.

(21) Appl. No.: 13/142,738

(22) PCT Filed: Dec. 22, 2009

(86) PCT No.: PCT/US2009/006680
§ 371 (c)(1),
(2), (4) Date: Jun. 29, 2011

(87) PCT Pub. No.: WO2010/077331
PCT Pub. Date: Jul. 8, 2010

(65) Prior Publication Data
US 2011/0272364 A1    Nov. 10, 2011

Related U.S. Application Data

(60) Provisional application No. 61/141,042, filed on Dec. 29, 2008.

(51) Int. Cl.
*C02F 1/70* (2006.01)
(52) U.S. Cl.
USPC ..... 210/739; 210/747.8; 210/757; 405/128.5; 405/128.75
(58) Field of Classification Search
USPC .................. 210/719, 747.7, 747.8, 757, 739; 405/128.5, 128.75; 166/264, 263
See application file for complete search history.

(56) References Cited

U.S. PATENT DOCUMENTS

| | | | |
|---|---|---|---|
| 4,200,523 A | 4/1980 | Balmat | |
| 4,254,831 A | 3/1981 | Nuzman | |
| 4,396,766 A | 8/1983 | Farmer, Jr. et al. | |
| 4,424,126 A | 1/1984 | Santhanam et al. | |
| 4,537,682 A | 8/1985 | Wong-Chong | |
| 5,354,459 A * | 10/1994 | Smith | 210/170.07 |
| 5,833,855 A | 11/1998 | Saunders | |
| 6,238,570 B1 * | 5/2001 | Sivavec | 210/747.8 |
| 6,398,960 B1 | 6/2002 | Borden et al. | |
| 6,679,992 B1 | 1/2004 | Kitagawa et al. | |
| 7,138,060 B2 | 11/2006 | Cuthbertson | |
| 7,192,218 B2 | 3/2007 | Peters et al. | |

OTHER PUBLICATIONS

Stuyfzand et al. "Water quality changes during Aquifer Storage and Recovery (ASR): resulting from pilot Herten (Netherlands), and their implications for modeling", ISMAR 2005: Aquifer Recharge: 5th International Symposium, Jun. 2005.*
International Search Report for International Application No. PCT/US2009/006680, mailed on Mar. 3, 2010 (1 page).

* cited by examiner

*Primary Examiner* — Lucas Stelling
(74) *Attorney, Agent, or Firm* — Perkins Coie LLP

(57) ABSTRACT

A method for providing for the use of underground aquifers for water storage for municipalities or recharge. Water is treated and injected for storage in the aquifer by the addition of a small amount of a sulfide compound to remove dissolved oxygen and prevent dissolution of negative valence sulfur bearing minerals, such as pyrite, in the subsurface. The stored water may be subsequently withdrawn from the aquifer and treated to remove residual amounts of sulfide ions. The withdrawn water being suitable as potable water, irrigation water, industrial use water, and aquifer water level enhancement water.

9 Claims, 2 Drawing Sheets

PROCESS FOR REMOVING OXIDANTS FROM WATER INJECTED INTO A SUBSURFACE AQUIFER TO PREVENT MOBILIZATION OF TRACE METALS

This is a new utility patent application which claims priority to U.S. Provisional Patent Application Ser. No. 61/141,042, filed Dec. 29, 2008.

BACKGROUND OF THE INVENTION

This application is directed towards methods of removing dissolved oxygen from water and to prevent the dissolution of negative valence sulfur bearing minerals, such as pyrite, in the subsurface. In particular, the methods are useful in making use of underground aquifers for water storage and for the subsequent recovery of this stored water for private or public use. The inventive methods are also useful for aquifer recharge wherein water is injected to increase water levels in an aquifer so that the water may be available at other sites where users may desire to produce from the aquifer or where recharge is used to prevent land subsidence. The water is prepared for injection or recharge by the addition of a small amount of sulfide compound to remove oxygen in order to prevent the mobilization of undesirable trace metals, such as arsenic, into the water.

Currently there are numerous systems for underground natural water storage. These include those taught in publicly available disclosures.

U.S. Pat. No. 7,192,218 describes an underground porosity water storage reservoir that minimizes the impacts on surface uses of the reservoir site. There is no discussion related to the prevention of leaching of unacceptable trace metals.

U.S. Pat. No. 4,254,831 describes a method and apparatus for restoring or maintaining an underground aquifer that is plagued with decreased water flow due to an accumulation of undesirable flow impeding agents in the aquifer. A series of injection wells are disclosed. Again, there is no discussion related to the prevention of mobilizating or leaching of unacceptable trace metals.

U.S. Pat. No. 7,138,060 discloses a method of in situ treatment of contaminated groundwater which includes identifying a site contaminated with a pollutant susceptible to degradation by sulfate reducing microorganisms. An amount of sulfate needed to metabolize the contaminants is estimated and applied. The sulfate concentration in solution is 1,000 ppm or more. This is a much higher concentration than would be acceptable for drinkable water or needed for the control of dissolved oxygen. The sulfate ion does not react with the dissolved oxygen as would a sulfide compound described herein.

The above mentioned patents do not disclose methods that provide for the control of oxygen in the water injected into a subsurface aquifer or the prevention of the dissolution of minerals in the subsurface that contain negative valence sulfides, such as pyrite, which contains arsenic. Lowering or eliminating the amount of dissolved oxygen will avoid trace metals, such as arsenic, from being mobilized into the underground water where such trace metals naturally exist in the natural underground aquifer rock material, i.e. strata.

The preservation and management of water resources has become an important focus of the environmental movement. In a great portion the United States and many other areas of the world, water is abundant only during seasonal periods. During these wet periods, there are often excess amounts of water, which is lost because it cannot be economically stored for use later during dry periods or periods of drought.

In recent years, newer technology has been developed that allows water to be captured and stored in ways that are more economical than traditional storage methods. The new technology involves capturing excess water and pumping it underground into certain subsurface geologic formations for storage. The water can later be recovered for use during dry periods. The process is commonly called aquifer storage and recovery (ASR) and it is conducted using wells for injection and recovery.

ASR is a now proven technology for storing large volumes of fresh water. There are sites where more than a billion gallons of water are stored and recovered annually by this process. Some common users of this technology are municipal water utilities and industry.

Pumping water into the ground is also done to recharge aquifer systems that are experiencing depletion due to over pumping. Injection of fresh water into aquifers is done to replenish aquifer systems for both environmental and human benefits. Protection of the quality of underground water resources is also an issue of extreme concern, and therefore regulations have been developed to control underground injection so that underground water resources can be protected. In the United States, the agency that regulates underground injection of water is the United States Environmental Protection Agency (EPA).

The EPA has adopted a water quality standard for potable water with regard to arsenic of 10 parts per billion (ppb) and other trace metals. In certain areas, arsenic mobilization in the subsurface affects the process of injecting water into the ground for storage and recharge. The regulations require that water may not be injected into an underground source of drinking water (USDW) if the act of injection causes the USDW to exceed a primary drinking water standard. It has been found in many cases that the injection of waters for the purpose of storage or recharge causes arsenic (and potentially other metals) within the aquifer to exceed drinking water standards. This is a violation of the EPA rules and therefore, where trace metals such as arsenic are released above regulatory limits, the practice of injection for storage or recharge must cease.

In most cases, where injection of water has caused a violation of the drinking water standard for arsenic, it is due to the oxidizing components of the injected water reacting with the natural minerals in the geologic formation and leaching or dissolving arsenic from its native state as a solid. Arsenic is often a trace constituent that occurs in pyrite in the subsurface. Studies have shown that the mobilization of arsenic is due, in part, to reactions with pyrite by such oxidizing constituents as dissolved oxygen, nitrates, and disinfectants such as the hypochlorite ion, chlorine, ozone that are present in the injected water. The oxidants react with subsurface minerals, such as pyrite, which are native to the subsurface environment. For pyrite, arsenic is the trace metal most commonly released in this process.

The present invention involves a unique method to treat the water to remove dissolved oxygen and other oxidants and thereby prevent the dissolution of subsurface negative valence subsurface sulfur based minerals, such as pyrite.

The present invention relates to the unique chemical properties of the sulfide ion—bisulfide ion—hydrogen sulfide chemical species, in low concentrations, which are injected into a water stream to remove dissolved oxygen, chlorine, and nitrogen oxides in the water prior to entry into a natural aquifer. The injected chemical also inhibits the dissolution of pyrite and similarly negative valence sulfur bearing minerals in subsurface geologic formations.

DETAILED DESCRIPTION OF THE PREFERRED EMBODIMENT

Figure 1:
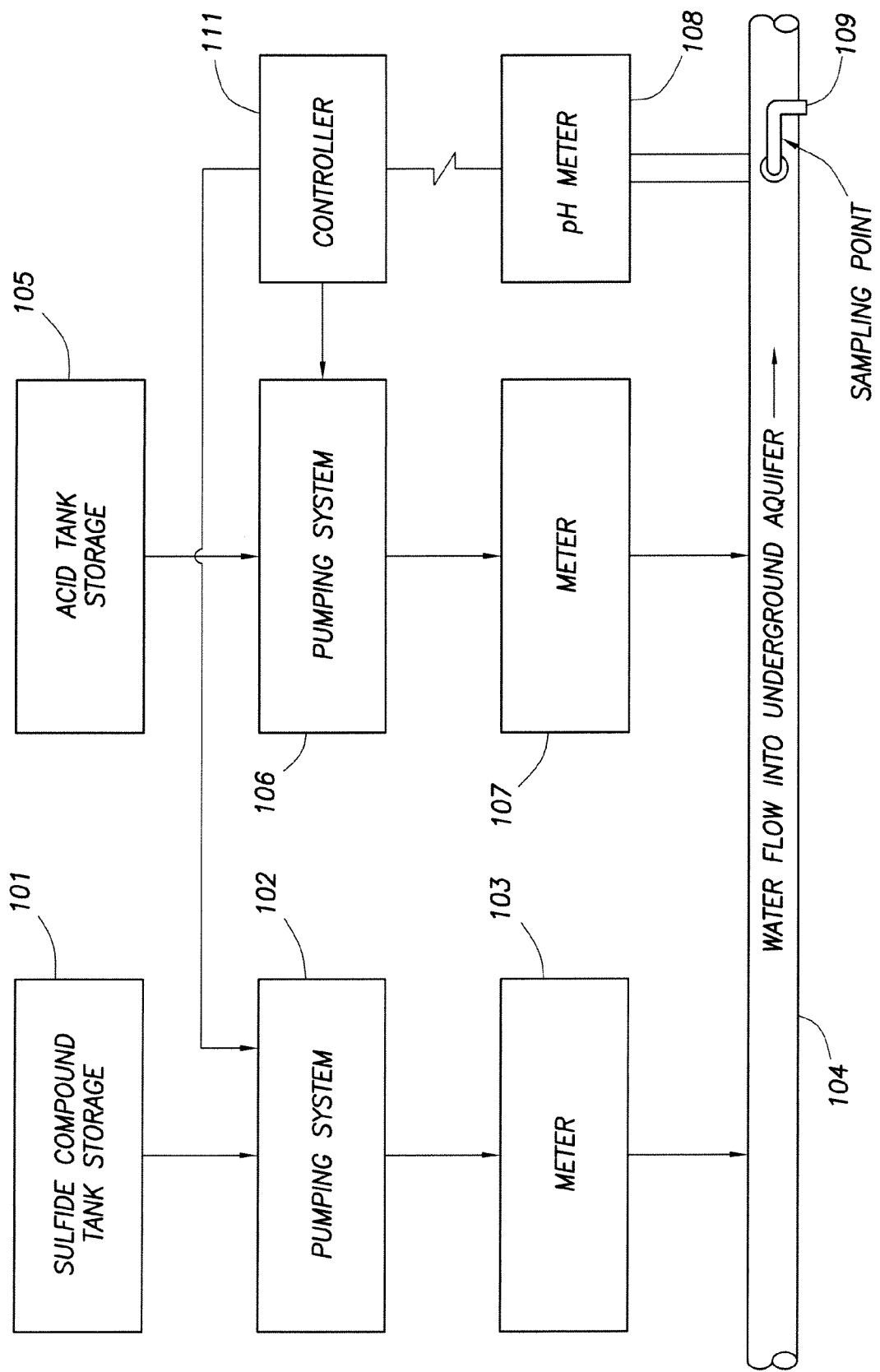
FIG. 1 shows an illustration of the sulfide injection control system and pH control system of the present invention.

Leaching of arsenic and other trace metals into waters that have been injected into the subsurface can be reduced by removing the dissolved oxidants from the injected water. Currently the methods being used and investigated to remove oxidants from water prior to injection for storage and recharge involve relatively expensive methods such as nitrogen purging, membrane separation, and catalytic processes, which typically involve relatively expensive mechanical equipment. The present invention entails a new process that involves only the addition of a chemical (a sulfide compound) to the flow stream, which will react with and eliminate the dissolved oxidants. Another feature of the process is that addition of the injected sulfide compound(s) provides chemical resistance to the dissolution of subsurface minerals such as pyrite; and, therefore, prevent the release of arsenic and other trace metals in the subsurface waters. In order to chemically deoxygenate water to be placed into the subsurface for storage or recharge, a chemical reducing agent will react with the oxygen in solution and oppose the dissolution of minerals such as pyrite within the geologic formation.

Other methods of removal of the oxygen, disinfectants, and nitrogen oxides from solution prevents the direct oxidation of pyrite. Nevertheless, some amount of pyrite dissolution would still occur in order to re-establish equilibrium as predicted by Le Chatelier's Principle. However, the addition of the sulfide ion will drive the reaction backwards toward the precipitation of pyrite and therefore add additional resistance against pyrite dissolution as indicated by the following chemical equation.

$$4FeS_2 + 4H_2O \rightarrow 4Fe^{2+} + 7S^{2-} + SO_4^{2-} + 8H^+ \qquad (1)$$

It is the ability of the sulfide ion to de-oxygenate the water and also reverse the dissolution reaction of pyrite that is of fundamental importance in the present invention.

The basic oxidation reduction reactions related to the sulfide ion and hydrogen sulfide chemistry relevant to the present invention include:

$$HS^- + 4H_2O \rightarrow SO_4^{-2} + 9H^+ + 8e^- \qquad (2)$$

$$FeS_2 + 2H^+ + 2e^- \rightarrow Fe^{+2} + 2HS^- \qquad (3)$$

$$4ClO^- + HS^- \rightarrow SO_4^{-2} + 4Cl^- + H^+ \qquad (4)$$

$$NO_3^- + H_2O + HS^- \rightarrow SO_4^{-2} + NH_3 \qquad (5)$$

The use of the sulfide ion at low concentrations provides the injected water with reducing properties that are similar to those of the natural formation waters without adding additional chemicals that are not normally found in subsurface waters. This is important since the water industry and household users are already familiar with the technologies required to rapidly remove sulfides from ground water and prepare the water for potable use.

In practice, the present invention will be utilized by mixing a sulfide compound such as sodium hydrosulfide into the water to be recharged/stored prior to its injection underground. Standard chemical mixing equipment is used for the mixing process.

When estimating the sulfide requirements of the present inventive method, the following information is required given that sodium hydrosulfide, NaSH, is the source of the sulfide or hydrosulfide ion.

1) C (O,ppm), the dissolved oxygen concentration in ppm,
2) F(NaSH), the concentrated NaSH given as the fraction of NaSH in solution by weight.

The density of the NaSH solution can be estimated using one of the following equations:

$$D\,(kg/l) = 0.6404\,F(NaSH) + 0.9984$$

Where:

D(kg/l)=the concentrated NaSH solution density at 75° F.

The weight of sulfide species in the concentrated solution is given by the following equation:

Wt sulfide in milligrams (Wt(Smg)) in 1 liter=Wt (Smg)

$$Wt(Smg) = 1E06 \times 32/56 \times F(NaSH) \times D(kg/l)$$

$$= 571{,}430\,F(NaSH) \times [0.6404\,F(NaSH) + 0.9984]$$

The volume of the concentrated NaSH solution. V(Smg), that needs to be added to a gallon of water to yield a 1 ppm solution of Sulfides is calculated using the following equation:

V(Smg)[1 gal×1 mg/l]/Smg Gal NaSH/Gal ASR influent

Where V(Smg)=volume of NaSH required to be added to obtain 1 mg/l as sulfides per gal of water being injected.

Let V(NaSH,1 MGD) equal the volume of a NaSH solution required to add to 695 gal to obtain 1 ppm sulfides $$V(1MGD) = 695 \times 1440 \times V(Smg)$$

For a 45% solution of NaSH,

V(Smg)=3.029E-06 gal NaSH/Gal of injected water,

V(NaSH, 1MGD)=3.03 gal

For a value of C ppm oxygen in the water to be injected, a minimum value of C/2 ppm of sulfide need to be added to remove the indicated oxygen concentration. The volume of NaSH that needs to be added is: C/2 V(Smg).

For a solution containing 8 ppm, then the volume of 45% NaSH solution required per day is:

C/2V(Smg)=8/2*3.03=12.12 gal/day.

Although the chemical compound sodium hydrosulfide is stated above, the present invention pertains to all sulfide compounds that cause the same reaction when mixed into water and injected into the subsurface. Such compounds include any soluble Group Ia or Group 2a metal sulfides, hydrosulfides (bisulfides), or hydrogen sulfide gas. Group I and Group II metals are those identified on a standard chemical periodic chart.

According to the present invention, it is expected that a range for the amount of injection of the sulfide containing compound into the water entering the aquifer is 0.5-10 parts per million (ppm) by weight of sulfides, depending upon the water being treated. In another embodiment, a more typical maximum amount would likely be 6 ppm sulfides, and average amounts may commonly be as low as 3 or 4 ppm. The treatment amount would ultimately depend upon the concentration of those chemical species capable of reacting with the sulfides in the water that is pumped into underground storage.

In practice, the equipment used would comprise pumping and piping equipment commonly used to move water into underground storage. The pumping/metering system for injecting the sulfide compound would consist of suitable pumps, piping and storage equipment, such as drums or tanks, as well as regulating equipment that would match the volume of inlet water in the correct ratio.

The injection of the sulfide compound will normally raise the pH of the water slightly to approximately 8-8.5. It may possibly be raised to as much as 9 if the water is very pure with little buffering. Consequently, it may be desirable that the pH be brought back to the normal level of 7 by injecting an acid. Suitable acids include HCl and dilute sulfuric acid. Additionally, $CO_2$ injection is another embodiment to lower the pH which works by creating carboxylic acid. A typical injection amount could be approximately 0.6 to 1 lbs of $CO_2$ per 1,000 gallons of water.

Since the injection of sulfides is likely to raise the pH of the solution, there is some potential that $CaCO_3$ may precipitate at the point of sulfide injection into the water to be injected. In order to avoid problems, it may be desirable to inject the acid into the water near the injection point for the sulfide solution, but not use a common injection point. It is important to prevent the release of hydrogen sulfide from the water prior to injection by not allowing the acid and sulfide compound to directly mix prior to injection into the water being treated for injection.

The effectiveness of sulfide compound is not reduced by turbidity but can be impacted if the iron concentration in solution exceeds regulatory standards. The level of sulfide in the water is low enough that no special precaution is required to protect the piping. Though sulfide stress cracking is a known problem for mild steel piping systems, common piping materials used for water such as PVC or fiberglass, can be employed to eliminate corrosion as an issue. The piping and pump materials used for the sulfide compound injection system should be designed to handle the sulfide compound which tends to have corrosive properties. Piping systems and materials resistive to the corrosive properties of the sulfide compound should be employed for success.

When withdrawing water from the aquifer, the sulfide compound is typically at a low levels.

If there is residual sulfide compound in the water being withdrawn from the aquifer it may be removed relatively easily. To remove the sulfide compound, a standard aeration system is used, such as sprays, flow over rocks, waterfall, etc. The sulfide reacts quickly with oxygen to become the sulfate ion.

The amount of sulfide to be injected depends upon the water quality being injected into the underground aquifer. The water being extracted from the aquifer may also be monitored for oxygen and arsenic and this may be used to modify the amount of sulfide being injected if needed on additional cycles.

FIG. 1 is a block diagram of a sulfide compound injection system and the pH control system. A sulfide compound, such as sodium hydrogen sulfide (or others as described above), is stored as an aqueous solution in tanks or drums 101. It is then pumped through a pump and piping system 102 and an optional meter 103 into the main transmission water pipe 104 used to convey water into the underground aquifer. The pumping system 102 may include automatic sulfide injection controls which are tied to continuous or periodic sampling of the input water quality.

In order to correct the pH of the water, an acid compound such as hydrochloric acid (or others described above) is stored in liquid form in tanks or drums 105. It is then pumped through pump and piping system 106 and a meter 107. A pH sensor 108 on the water flow line 104 may be installed to monitor and adjust the sulfide and acid injection rates or ratio to the water flow rate via a standard chemical controller 111. A sampling point 109 on the system may be used to verify water quality and check for various quality issues, such as the amount of oxygen or the amount of sulfide in the water. The sampling may be done continuously through a port monitor 109 or it may be done periodically by taking samples back to a laboratory and manually adjusting the sulfide and acid pumping systems 102 and 106.

Figure 2:
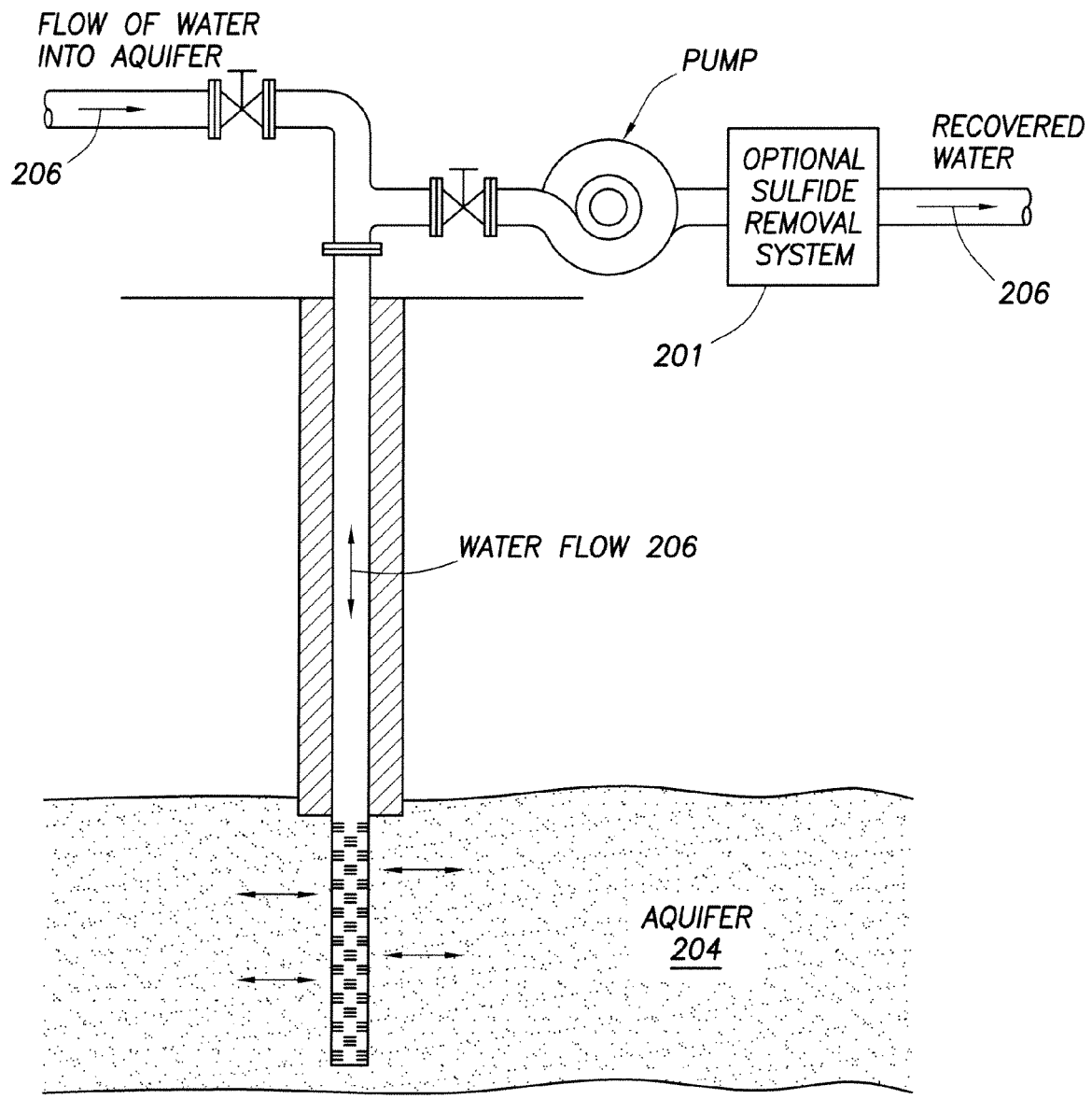
FIG. 2 shows a simplified illustration of the underground aquifer and pumping system of the present invention.

FIG. 2 provides a simplified sketch of a pumping system for an injection well. A optional sulfide treatment (removal) system 201 may be used to treat water withdrawn from t aquifer 204 as needed. Pumps are used to move the water flow 206 in and out of the aquifer 204 or natural underground storage aquifer. The pumping system that puts the water into the underground aquifer is commonly associated with a water treatment plant operation. The pump used to withdraw water is often located within the casing of the well. Typically, the target storage or recharge aquifer lies 100 or more feet below land surface. The sketch shown is only an illustration. Various other pump arrangements may be utilized with success that are known in the art, and include suction pumps, submersible pumps and pumps that can draw water from great depths. FIG. 2 is only an illustration of one possible embodiment of the present invention. The water recovered from storage may not need to pass through the sulfide treatment system 201 before being used.

Water aeration systems are known in the art. For example, U.S. Pat. No. 5,618,417 discloses a counter flow water aeration system which uses a turbo blower to deliver a higher volume of air to purify gas and/or iron laden water. The teachings can readily be adapted to provide oxygen in the water to react with any residual amount of sulfide compound remaining in the water. U.S. Pat. No. 5,618,417 is hereby incorporated by reference for all purposes. Various other ways are known to introduce oxygen into water and include creating waterfalls, cascading systems over rocks or obstacles, and open air tank agitation. Any or all of these methods can be employed to add oxygen to the water in order to react with any residual amount of sulfide compound remaining in the water prior to its use.

While various embodiments of the present invention, which is the use of the sulfide ion to reduce or eliminate dissolved oxygen from water prior to underground injection for recharge or storage in order to control the dissolution of negative valence sulfur minerals in the subsurface, have been described, the invention may be modified and adapted to various operational methods to those skilled in the art. Therefore, this invention is not limited to the description and figure shown herein, and includes all such embodiments, changes, and modifications that are encompassed by the scope of the claims.

The invention claimed is:

1. A method to prevent pyrite dissolution in natural underground aquifers utilized for water storage comprising:
   (a) injecting a measured amount of a sulfide compound into water to be stored in the underground aquifer thereby forming a treated water, pumping the treated water into the underground aquifer, wherein infection of said measured amount of sulfide compound causes a range of approximately 0.5 ppm to approximately 10 ppm sulfides by weight in the treated water, and wherein the amount of sulfide compound injected into said water to be stored is based on the measured flow rate and nature of said water to be stored, (b) storing the treated water in said underground aquifer;

(c) subsequently withdrawing the treated water from said underground aquifer and measuring the amount of sulfide in said withdrawn treated water.

2. The method of claim 1, further comprising pumping the withdrawn treated water through a treatment system wherein residual amounts of sulfide ions are removed.

3. The method according to claim 1, wherein said sulfide compound is a compound selected from the group consisting of Group Ia and Group IIa sulfides, hydrosulfides (bisulfides), and hydrogen sulfide.

4. The method according to claim 3, wherein said natural underground aquifer is used in a recharge aquifer system.

5. The method according to claim 1, wherein said sulfide compound is sodium hydrosulfide.

6. The method of claim 1, wherein said natural underground aquifer has strata containing arsenic and other trace metals.

7. The method of claim 1, further comprising monitoring the pH of said treated water being pumped and adjusting the pH of the said treated water with an acid compound.

8. The method according to claim 7, wherein said acid compound is selected from the group consisting of hydrochloric acid, diluted sulfuric acid, and carboxylic acid.

9. The method according to claim 1, wherein said withdrawn treated water is suitable for use as potable water, irrigation water, industrial use water, or aquifer water level enhancement water.

* * * * *